(12) United States Patent
Ota et al.

(10) Patent No.: US 10,888,953 B2
(45) Date of Patent: Jan. 12, 2021

(54) LASER PROCESSING DEVICE

(71) Applicant: PANASONIC INDUSTRIAL DEVICES SUNX CO., LTD., Aichi (JP)

(72) Inventors: Takahiro Ota, Aichi (JP); Tomoyuki Nakatsuka, Aichi (JP); Keita Nagatoshi, Aichi (JP)

(73) Assignee: PANASONIC INDUSTRIAL DEVICES SUNX CO., LTD., Aichi (JP)

( * ) Notice: Subject to any disclaimer, the term of this patent is extended or adjusted under 35 U.S.C. 154(b) by 0 days.

(21) Appl. No.: 16/345,528

(22) PCT Filed: Nov. 29, 2017

(86) PCT No.: PCT/JP2017/042921
§ 371 (c)(1),
(2) Date: Apr. 26, 2019

(87) PCT Pub. No.: WO2018/105648
PCT Pub. Date: Jun. 14, 2018

(65) Prior Publication Data
US 2019/0283451 A1    Sep. 19, 2019

(30) Foreign Application Priority Data

Dec. 8, 2016 (JP) ................. 2016-238837

(51) Int. Cl.
*B23K 26/00* (2014.01)
*B23K 26/06* (2014.01)
(Continued)

(52) U.S. Cl.
CPC .......... *B23K 26/00* (2013.01); *B23K 26/0665* (2013.01); *B23K 26/0838* (2013.01); *B41M 5/26* (2013.01)

(58) Field of Classification Search
CPC ................ B23K 26/00; B23K 26/0838; B23K 26/0665; B23K 26/355; B23K 26/364;
(Continued)

(56) References Cited

U.S. PATENT DOCUMENTS

| 4,623,797 A | 11/1986 | Eaton et al. |
| 5,734,412 A | 3/1998 | Hasebe et al. |

(Continued)

FOREIGN PATENT DOCUMENTS

| CN | 101376302 A | 3/2009 |
| CN | 104108579 A | 10/2014 |

(Continued)

OTHER PUBLICATIONS

International Search Report Issued in Patent Application No. PCT/JP2017/042921 dated Nov. 29, 2017.
(Continued)

*Primary Examiner* — Justin Seo
(74) *Attorney, Agent, or Firm* — Pearne & Gordon LLP

(57) ABSTRACT

A laser marker device (11) includes: a free running counter (16) configured to output a free count value (Cf) obtained by counting the number of pulses of a pulse signal; a FIFO memory (15) configured to sequentially store the free count value as a trigger timing count value every time a trigger signal (tr) is output from a trigger sensor (13); a printing control unit (17, 18) configured to sequentially read out the trigger timing count value from the memory in order of storage, recognize a position of a workpiece to be printed next, and perform printing processing with respect to the workpiece if the workpiece is conveyed to the printing position.

5 Claims, 6 Drawing Sheets

(51) Int. Cl.
*B41M 5/26* (2006.01)
*B23K 26/08* (2014.01)

(58) Field of Classification Search
CPC .... B23K 26/40; B23K 26/03; B23K 26/0006; B41M 5/26; B41J 2/47
See application file for complete search history.

(56) References Cited

U.S. PATENT DOCUMENTS

| | | | |
|---|---|---|---|
| 6,061,081 A | | 5/2000 | Hasebe et al. |
| 2006/0052962 A1 | * | 3/2006 | Shipton .................. H04N 1/405 |
| | | | 702/106 |

FOREIGN PATENT DOCUMENTS

| | | |
|---|---|---|
| CN | 104267041 A | 1/2015 |
| CN | 105397305 A | 3/2016 |
| JP | H03-076677 U | 7/1991 |
| JP | H05-245639 A | 9/1993 |
| JP | H07-33475 U | 6/1995 |
| JP | H08-139215 A | 5/1996 |
| JP | 2000-202656 A | 7/2000 |
| JP | 2005-211979 A | 8/2005 |
| JP | 2005-279937 A | 10/2005 |
| JP | 2009-006394 A | 1/2009 |

OTHER PUBLICATIONS

Written Opinion Issued in Patent Application No. PCT/JP2017/042921 dated Nov. 29, 2017.
Extended European Search Report issued in European Patent Application EP 17 87 9243 dated Feb. 10, 2020.

\* cited by examiner

LASER PROCESSING DEVICE

TECHNICAL FIELD

The present invention relates to a laser processing device for irradiating a workpiece with laser light to perform printing or drawing.

BACKGROUND ART

FIG. 5 illustrates an example of a laser processing device of the related art. Below a laser marker device 1, a belt conveyor 2 is disposed, and multiple workpieces (A to C in FIG. 5) are sequentially delivered to a lower part of the laser marker device 1 at a predetermined interval.

On the belt conveyor 2, a trigger sensor 3 for optically detecting each of the workpieces A to C is installed at a position separated from the laser marker device 1 by a distance d. The trigger sensor 3 outputs a trigger signal tr to the laser marker device 1 every time the workpieces A to C which move on the belt conveyor 2 are detected.

An encoder 4 for detecting a transfer position of each workpiece is disposed on the belt conveyor 2. The encoder 4 outputs a continuous pulse signal p to the laser marker device 1 based on a transfer distance of the belt conveyor 2.

The laser marker device 1 calculates a movement position of each workpiece based on the trigger signal tr and the pulse signal p. In addition, based on the calculated value, the workpiece is irradiated with laser light L at the timing when each workpiece moves to a printing position which is at a lower position of the laser marker device 1, and printing or drawing processing is performed.

The distance d between the trigger sensor 3 and the laser marker device 1 is ensured such that a detection error detected by the trigger sensor 3 is not generated due to adhesion of smoke or the like generated by the irradiation of the workpiece with the laser light L.

FIG. 6 is a timing chart illustrating printing processing of the laser marker device 1. When the trigger sensor 3 detects, for example, the workpiece A and a trigger signal tra is input into the laser marker device 1, the laser marker device 1 calculates a delay time td until the workpiece A moves to the printing position based on the pulse signal output from the encoder 4.

In addition, after the elapse of the delay time td, a printing start signal ps is output to a laser control unit in the laser marker device 1, and a printing operation my for irradiating the workpiece A with the laser light L is performed. Such operations are repeated, and the printing processing is sequentially performed with respect to the subsequent workpieces B, C, and the like.

RELATED ART DOCUMENT(S)

Patent Document(s)

Patent Document 1: JP-A-2000-202656

SUMMARY OF THE INVENTION

Problem to be Solved by the Invention

In the above-described laser processing device, after receiving the trigger signal tra in the laser marker device 1, before outputting the printing start signal ps and starting the printing operation my, when receiving a trigger signal trb obtained by the detection of the next workpiece B by the trigger sensor 3, the trigger signal trb is canceled, and the printing processing with respect to the workpiece B is not performed.

For example, it is necessary to set the interval between each workpiece to be greater than the distance d between the trigger sensor 3 and the laser marker device 1. Therefore, in a case of performing the printing processing with respect to a large number of workpieces, the interval between each workpiece cannot be reduced to be equal to or less than the distance d, and thus, there is a problem that the processing time and the processing cost increase.

Patent Document 1 discloses a laser marker device that performs an abnormal output when the next print trigger signal is captured while the control unit is performing the printing processing. However, there is no idea of narrowing the conveyance interval of the workpiece and suppressing the printing processing time and the processing cost for a large number of workpieces.

The present invention has been made in view of the above-described circumstances, and an object thereof is to provide a laser processing device capable of shortening the printing processing time for multiple workpieces.

Means for Solving the Problem

In order to solve the above-described problem, there is provided a laser processing device including: a trigger sensor configured to detect multiple workpieces sequentially conveyed by a workpiece conveying device at a workpiece detection position, and output a trigger signal every time a workpiece is detected; a laser marker device configured to sequentially perform printing processing with respect to the workpiece if the workpiece is conveyed to a printing position based on the trigger signal; and an encoder configured to output a pulse signal such that a number of pulses corresponds to a workpiece conveying distance of the workpiece conveying device, wherein the laser marker device includes: a free running counter configured to output a free count value obtained by counting the number of pulses in the pulse signal; a FIFO memory configured to sequentially store the free count value as a trigger timing count value every time the trigger signal is output; and a printing control unit configured to sequentially read out the trigger timing count value from the FIFO memory in order of storage, recognize a position of the workpiece to be printed next, and perform the printing processing with respect to the workpiece if the workpiece is conveyed to the printing position.

With this configuration, the position of the workpiece is recognized and output based on the trigger timing count value read out from the FIFO memory, and if the workpiece is conveyed to the printing position, the printing processing is performed with respect to the workpiece.

In addition, in the laser processing device, it is preferable that the printing control unit include a printing processing CPU configured to compare the trigger timing count value with the free count value at a time of reading out of the trigger timing count value, compute the position of the workpiece to be printed next, and perform a control so as to wait for the printing processing until the workpiece is transferred to the printing position.

With this configuration, the position of the workpiece to be printed next is computed based on the trigger timing count value and the free count value at the time of reading out of the trigger timing count value, and if the workpiece reaches the printing position, the printing processing is performed.

In addition, in the laser processing device, it is preferable that the printing control unit include: the printing processing CPU configured to compute a remaining distance to the printing position of the workpiece based on the position of the workpiece; and a printing timing measurement counter configured to compute an arrival timing at which the workpiece arrives at the printing position based on the remaining distance, and output a printing start signal to the printing processing CPU at the arrival timing.

With this configuration, the printing timing for the workpiece is computed by the printing processing CPU and the printing timing measurement counter.

In addition, in the laser processing device, it is preferable that the printing timing measurement counter be configured to compute the arrival timing based on the remaining distance and the pulse signal output from the encoder.

With this configuration, by counting the pulse signal of the encoder with the number of pulses that corresponds to the remaining distance, the arrival timing of the workpiece to the printing position is computed.

In addition, in the laser processing device, it is preferable that the printing processing CPU be configured to generate printing data of the workpiece to be printed next during waiting for the printing processing.

With this configuration, during waiting for the printing processing, printing data of the workpiece to be printed next is generated.

Advantages of the Invention

According to the laser processing device of the present invention, it is possible to shorten the printing processing time for multiple workpieces.

MODE FOR CARRYING OUT THE INVENTION

Figure 1:
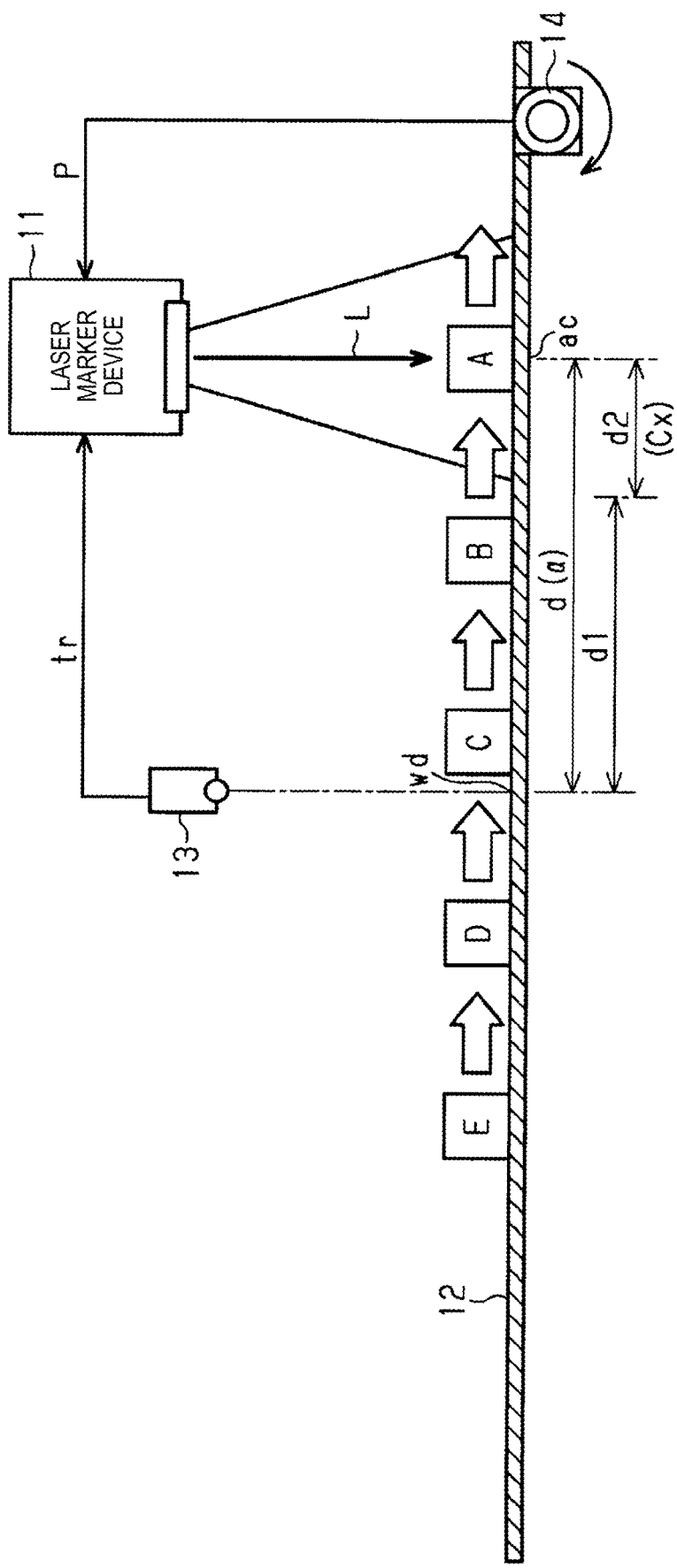
FIG. 1 is a schematic view illustrating a laser processing device of an embodiment.

Hereinafter, one embodiment of a laser processing device will be described with reference to the drawings. In the laser processing device illustrated in FIG. 1, a belt conveyor 12 is disposed below a laser marker device 11, and multiple workpieces (A to E in FIG. 1) are sequentially delivered to a lower part of the laser marker device 11 at a predetermined interval.

On the belt conveyor 12, a trigger sensor 13 for detecting each workpiece A to E is installed upwardly a workpiece detection position wd separated from the laser marker device 11 by a distance d. The trigger sensor 13 sequentially outputs a trigger signal tr to the laser marker device 11 when the workpieces A to E which move on the belt conveyor 12 is optically detected.

An encoder 14 for detecting a transfer position of each workpiece is disposed on the belt conveyor 12. The encoder 14 generates and outputs a pulse signal p based on a rotation angle of a rotation member that rotates based on movement of the belt conveyor 12. Therefore, the encoder 14 outputs one pulse signal to the laser marker device 11 every time the belt conveyor 12 moves a certain distance. In this embodiment, more than 100 pulses per one time of rotation of the rotation member are output, and a movement amount of the belt conveyor 12, that is, a movement position of the workpiece can be detected in millimeters.

The laser marker device 11 calculates the movement position of each workpiece based on the trigger signal tr and the pulse signal p. In addition, based on the calculated value, the workpiece is irradiated with laser light L at the timing when each workpiece moves to the printing position which is a lower position of the laser marker device 11, and printing or drawing processing is performed.

A distance d between the trigger sensor 13 and the laser marker device 11 is ensured such that a detection error detected by the trigger sensor 13 is not generated due to adhesion of smoke or the like generated by printing processing with the laser light L with respect to the workpiece.

Figure 2:
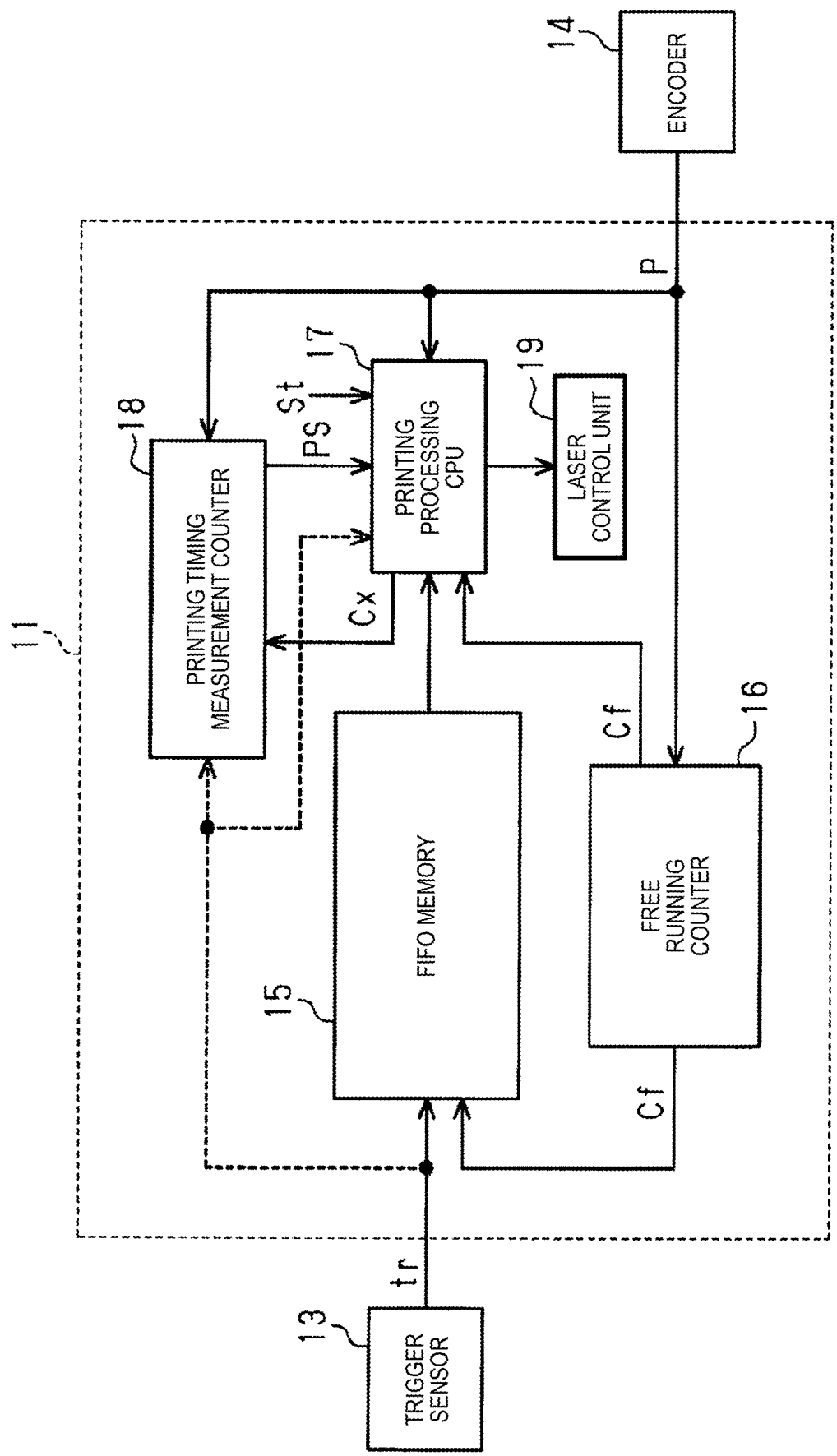
FIG. 2 is a block diagram illustrating an electrical configuration of the laser processing device of the embodiment.

FIG. 2 illustrates an electrical configuration of the laser marker device 11. The trigger signal tr output from the trigger sensor 13 is input into a first in first out (FIFO) memory 15. The pulse signal p output from the encoder 14 is input into a free running counter 16. The free running counter 16 counts the pulse signal p and outputs a free count value (integrated value) Cf thereof to the FIFO memory 15.

Every time the trigger signal tr is input, the FIFO memory 15 stores the free count value Cf of the free running counter 16 at the timing when the trigger signal tr is input as a trigger timing count value. For example, when the workpieces A to E are sequentially detected by the trigger sensor 13 and the trigger signal tr is sequentially input into the FIFO memory 15, the free count value Cf of the free running counter 16 at the time when each of the workpieces A to E is detected is sequentially stored in the FIFO memory 15 as trigger timing count values Ca to Ce.

The trigger timing count values Ca to Ce stored in the FIFO memory 15 are sequentially output to a printing processing CPU 17. In other words, the FIFO memory 15 outputs the trigger timing count values stored in advance in order to the printing processing CPU 17 based on the read-out signal from the printing processing CPU 17.

In the printing processing CPU 17, the count value counted by the free running counter 16 until the workpieces A to E move by the distance d between the trigger sensor 13 and the printing position of the laser marker device 11 is stored in advance as a fixed value a. Further, the free count value Cf is input into the printing processing CPU 17 from the free running counter 16.

In addition, the printing processing CPU 17 reads out the trigger timing count value when terminating the printing operation with respect to the workpiece and calculates a difference d1 between the trigger timing count value and the free count value Cf. The difference corresponds to the distance by which the workpiece to be printed next moves from the workpiece detection position wd.

Next, the printing processing CPU 17 calculates a remaining count value Cx that corresponds to a remaining distance d2 obtained by subtracting the difference d1 from the fixed value a, and outputs the remaining count value Cx to a printing timing measurement counter 18. The remaining count value Cx is a count value of the free running counter 16 while the workpiece to be printed next moves to a printing position ac from the time when the trigger timing count value is read out.

The pulse signal p is input into the printing timing measurement counter 18 from the encoder 14. In addition, the printing timing measurement counter 18 counts the pulse signal p based on the input of the remaining count value Cx, and when the count value reaches the remaining count value Cx, the printing timing measurement counter 18 outputs a printing start signal ps to the printing processing CPU 17.

The printing processing CPU 17 outputs a control signal to the laser control unit 19 based on the input of the printing start signal ps and starts the printing operation with respect to the workpiece.

In addition to the above-described multi trigger operation, the above-described laser processing device has a single trigger function similar to that of the related art. A switching signal st for the operation with the single trigger function can be input into the printing processing CPU 17.

When the switching signal st is input, the trigger signal tr is directly input from the trigger sensor 13 into the printing processing CPU 17 and the printing timing measurement counter 18. The printing timing measurement counter 18 resets the count value of the pulse signal p based on the input of the trigger signal tr and outputs the printing start signal ps to the printing processing CPU 17 when the workpiece has moved to the printing position.

By such an operation, when the workpiece detected by the trigger sensor 13 is transferred to the printing position, the printing processing is performed by the laser marker device 11.

In a case where the printing processing cost does not increase even when the workpiece transfer interval is equal to or greater than the distance d between the workpiece detection position wd and the printing position ac, the operation by the above-described single trigger is selected.

In the operation by the single trigger, since the trigger signal tr by the detection of the next workpiece is canceled until the printing processing is started with respect to the workpiece detected at the workpiece detection position wd, a malfunction due to the noise output from the trigger sensor 13 can be suppressed.

Next, the operation of the laser processing device configured as described above will be described.

Figure 3:
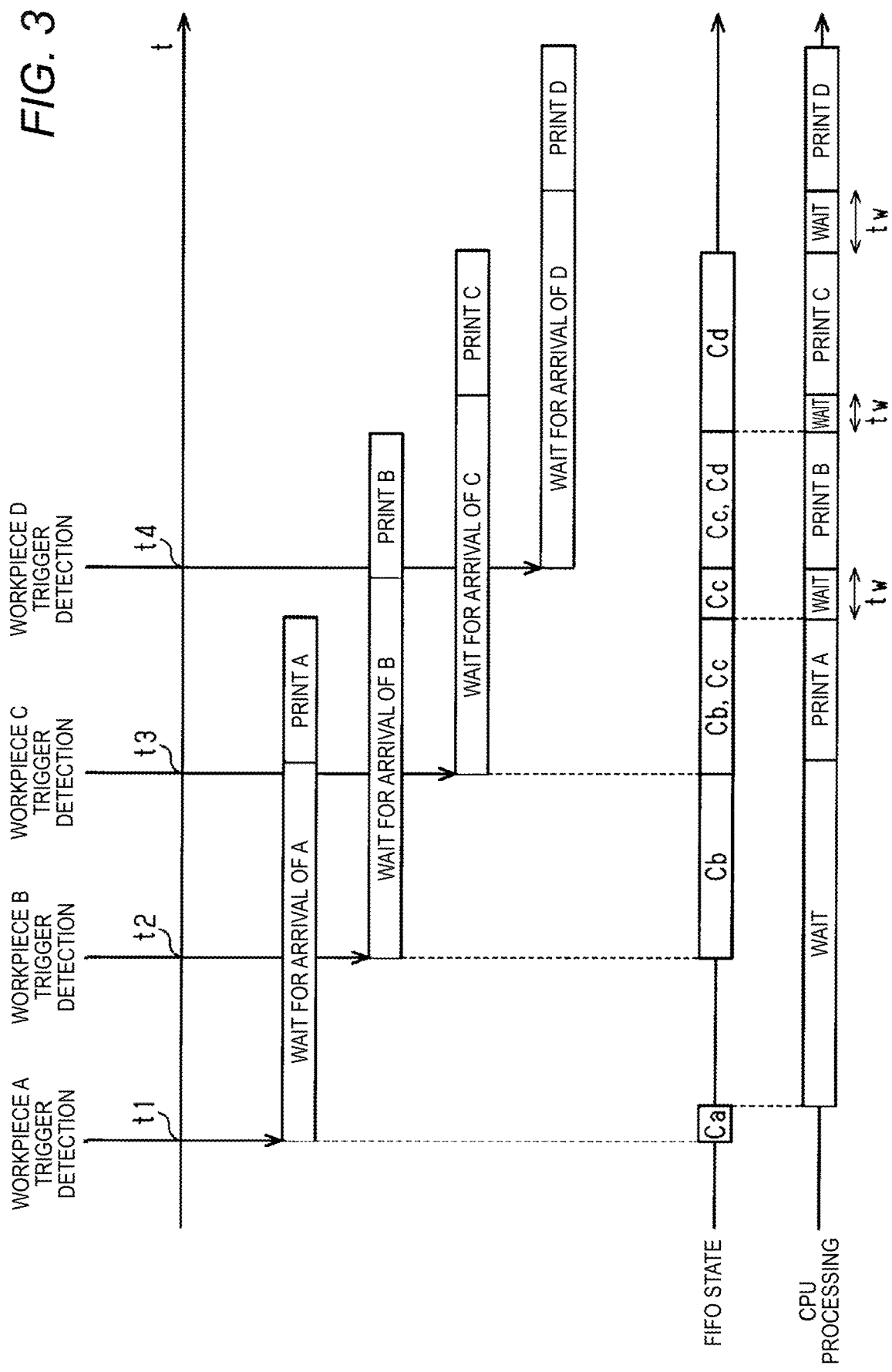
FIG. 3 is a timing chart illustrating a printing operation according to the embodiment.

As illustrated in FIG. 3, when the workpieces A to D are sequentially transferred toward the laser marker device 11 by the belt conveyor 12, the first workpiece A is first detected by the trigger sensor 13 at time t1.

Then, the trigger signal tr is output from the trigger sensor 13 to the FIFO memory 15, and the free count value Cf at the time when the workpiece A is detected is stored as the trigger timing count value Ca in the FIFO memory 15.

The printing processing CPU 17 is in a state of waiting for reading out the trigger timing count value from the FIFO memory 15 at the start of printing, and when the workpiece A is detected, the printing processing CPU 17 immediately reads out the trigger timing count value Ca. In addition, in the first workpiece A, since the trigger timing count value Ca input into the printing processing CPU 17 is equal to the free count value Cf, a remaining distance d2 becomes equal to the distance d between the workpiece detection position wd and the printing position ac.

As a result, the remaining distance d2 which is equal to the distance d is input into the printing timing measurement counter 18. In addition, when the workpiece A moves to the printing position ac, the printing start signal ps is output from the printing timing measurement counter 18 to the printing processing CPU 17, and the printing operation with respect to the workpiece A is started.

Before the printing processing with respect to the workpiece A is started, when the workpiece B is detected by the trigger sensor 13 at time t2 and the trigger signal tr is input into the FIFO memory 15, the free count value Cf at the time when the workpiece B is detected is stored in the FIFO memory 15 as the trigger timing count value Cb.

Similarly, before the printing processing with respect to the workpiece A is started, when the workpiece C is detected by the trigger sensor 13 at time t3 and the trigger signal tr is input into the FIFO memory 15, the free count value Cf at the time when the workpiece C is detected is stored in the FIFO memory 15 as the trigger timing count value Cc.

Similarly, when the workpiece D is detected by the trigger sensor 13 at time t4 and the trigger signal tr is input into the FIFO memory 15, the free count value Cf at the time when the workpiece D is detected is stored in the FIFO memory 15 as the trigger timing count value Cd.

When the printing processing with respect to the workpiece A is terminated, the printing processing CPU 17 reads out the next trigger timing count value Cb from the FIFO memory 15. Then, the printing processing CPU 17 calculates the difference d1 between the trigger timing count value Cb and the free count value Cf, further computes the remaining distance d2 up to the printing position, and outputs the remaining count value Cx to the printing timing measurement counter 18.

The printing timing measurement counter 18 counts the pulse signal p based on the input of the remaining count value Cx, and when the count value reaches the remaining count value Cx, the printing timing measurement counter 18 outputs the printing start signal ps to the printing processing CPU 17.

Then, a control signal is output from the printing processing CPU 17 to the laser control unit 19, and a printing operation with respect to the workpiece B is started. Similarly, when the printing processing with respect to the workpiece B is terminated, the printing processing CPU 17 reads out the next trigger timing count value Cc from the FIFO memory 15. Then, the printing processing CPU 17 calculates the difference d1 between the trigger timing count value Cc and the free count value Cf, further computes the remaining distance d2 up to the printing position ac, and outputs the remaining count value Cx to the printing timing measurement counter 18.

The printing timing measurement counter 18 counts the pulse signal p based on the input of the remaining count value Cx, and when the count value reaches the remaining count value Cx, the printing timing measurement counter 18 outputs the printing start signal ps to the printing processing CPU 17.

Then, a control signal is output from the printing processing CPU 17 to the laser control unit 19, and the printing operation with respect to the workpiece C is started. Such an operation is repeated, and the printing processing is sequentially performed with respect to subsequent workpieces.

In addition, in FIG. 3, there is a waiting time tw required for the movement until the next workpiece reaches the printing position from the termination of the printing processing of each workpiece. In the printing processing CPU 17, during the waiting time tw, printing data that corresponds to the workpiece to be printed next is generated.

Figure 4:
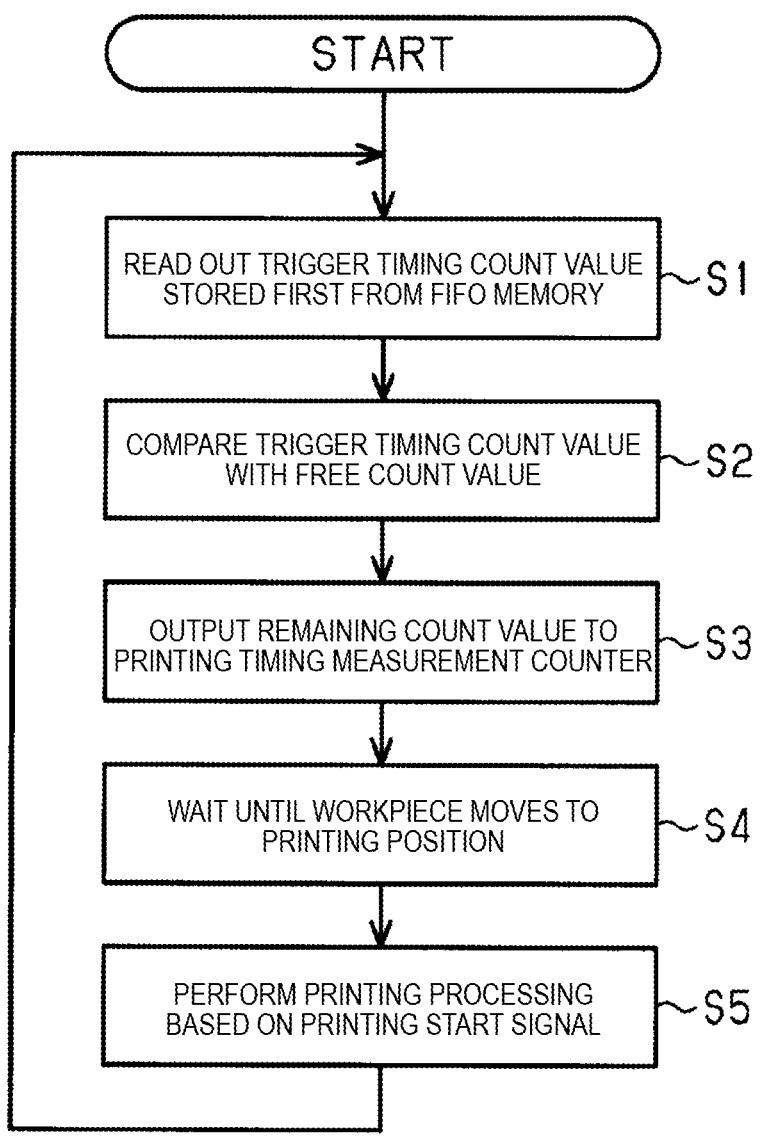
FIG. 4 is a flowchart illustrating an operation of a printing processing CPU.
Figure 5:
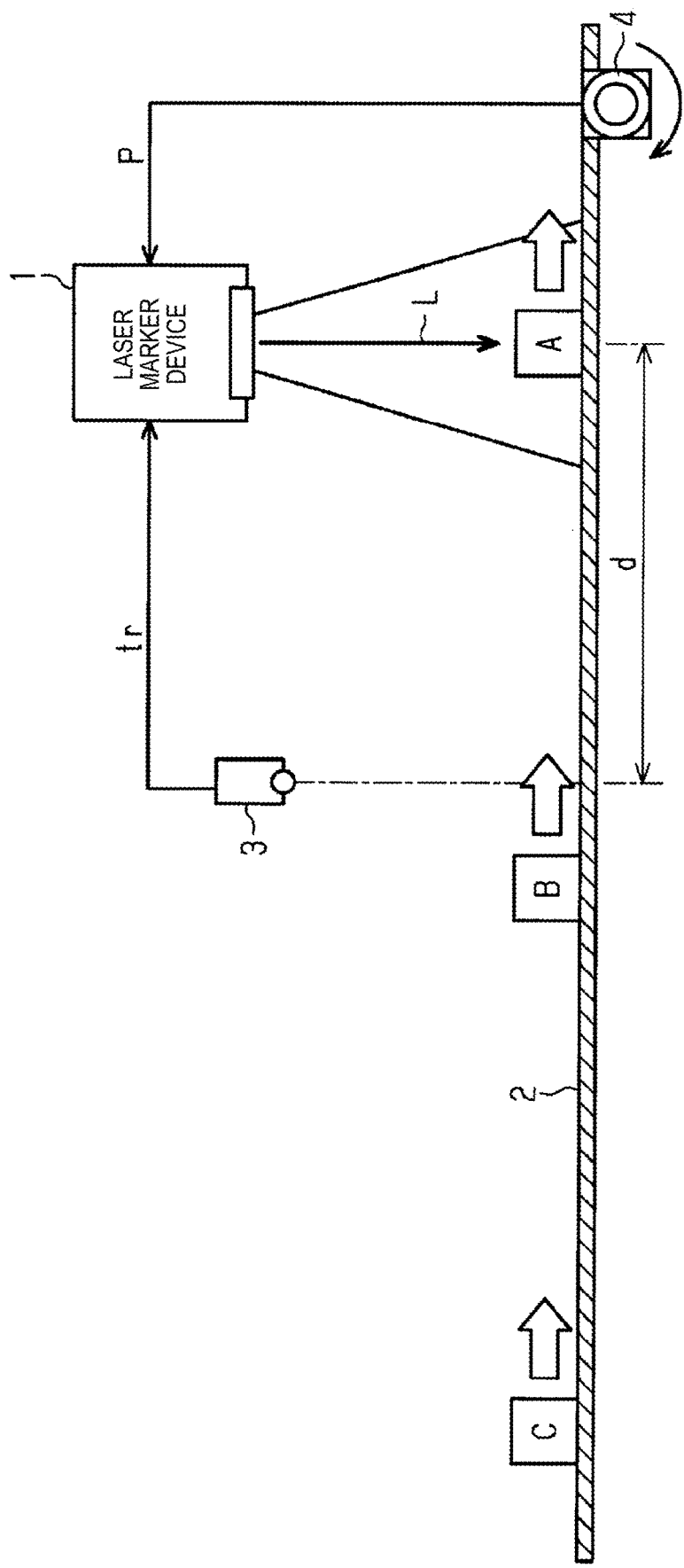
FIG. 5 is a schematic view illustrating an example of the related art.
Figure 6:
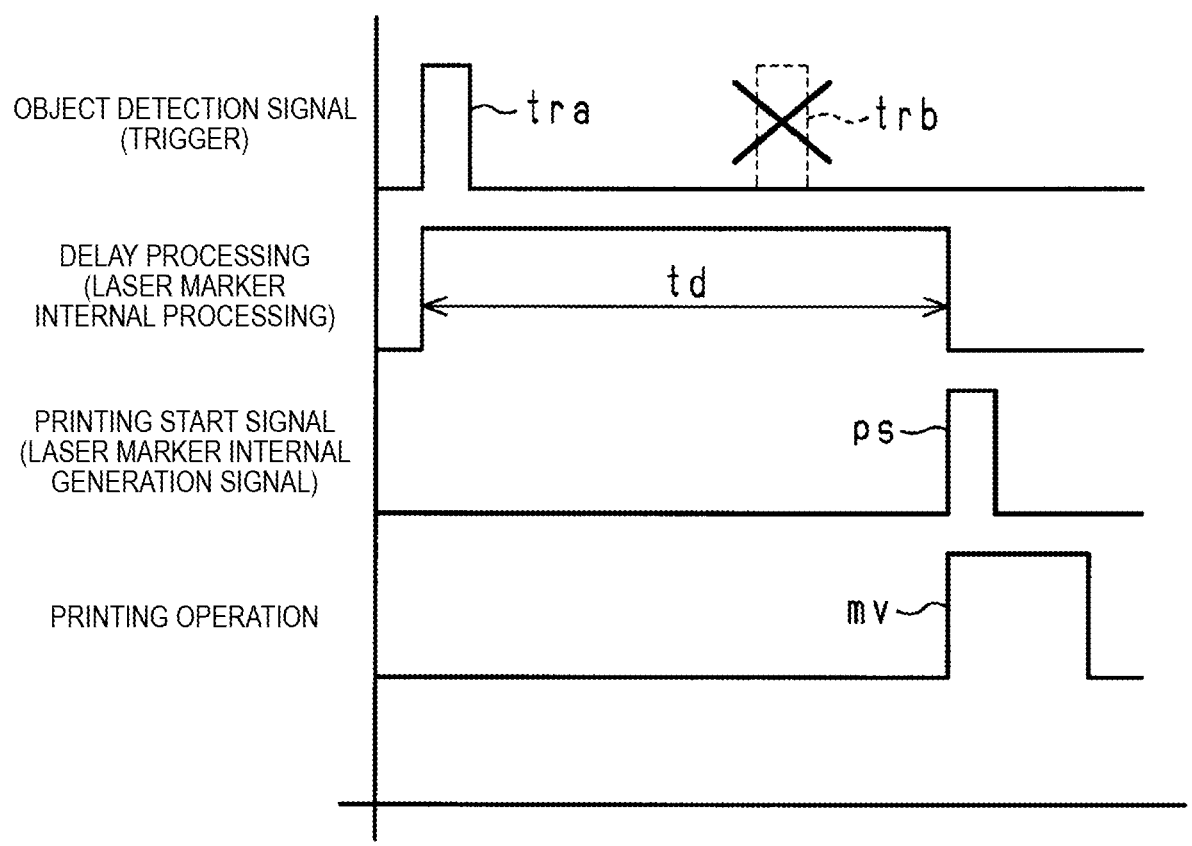
FIG. 6 is a timing chart illustrating an operation of the example of the related art.

FIG. 4 illustrates the operation of the printing processing CPU 17 in the printing processing operation as described above.

Based on the start of the printing processing operation, the printing processing CPU 17 reads out the trigger timing count value stored in advance from the FIFO memory 15 (S1).

Next, the free count value Cf at the time when the trigger timing count value is read out is compared with the read-out trigger timing count value (S2), and the remaining distance d2 is computed from the difference d1 and output to the printing timing measurement counter 18 (S3).

In addition, when receiving the printing start signal ps from the printing timing measurement counter 18 after waiting for the printing processing until the next workpiece arrives at the printing position (S4), the printing processing is performed with respect to the workpiece to be printed (S5).

When the printing processing is terminated, the process shifts to S1, the above-described operation is repeated, and the printing processing is sequentially performed with respect to the subsequent workpiece.

In the above-described laser processing device, the following effects can be obtained.

(1) The workpieces A to E transferred by the belt conveyor 12 are sequentially detected by the trigger sensor 13 at the workpiece detection position wd, and the trigger signal tr is sequentially output to the FIFO memory 15. The FIFO memory 15 sequentially stores the free count value Cf at the input timing of each trigger signal tr as the trigger timing count values Ca to Ce. The printing processing CPU 17 sequentially reads out the trigger timing count values Ca to Ce from the count value stored in advance and performs the printing processing at the time when the workpiece has moved to the printing position. Therefore, even when the interval between each of the workpieces A to E is less than the distance d between the workpiece detection position wd and the printing position ac, the printing processing can be sequentially performed with respect to each of the workpieces A to E. As a result, it is possible to shorten the time required for performing the printing processing with respect to a large number of workpieces.

(2) Based on the comparison between the free count value Cf at the time when each of the trigger timing count values Ca to Ce is read out and each of the trigger timing count values Ca to Ce, the printing processing CPU 17 grasps the movement position of the workpiece to be printed next, waits until the workpiece moves to the printing position, and then can perform the printing processing with respect to the workpiece. Therefore, it is possible to recognize the movement position of each workpiece and to perform the normal printing processing with respect to each workpiece.

(3) The printing processing CPU 17 calculates the remaining distance d2 up to the printing position of the workpiece to be printed next based on the trigger timing count values Ca to Ce and the free count value Cf, and outputs the remaining distance d2 to the printing timing measurement counter 18. When counting the pulse signal p of the encoder 14 and counting the number of pulses that corresponds to the remaining distance d2, the printing timing measurement counter 18 outputs the printing start signal ps to the printing processing CPU 17. Therefore, it is possible to accurately grasp the timing at which the workpiece to be printed next moves to the printing position.

(4) It is possible to grasp the movement position of the workpiece to be printed next and to generate the printing start signal ps based on the pulse signal p output from the common encoder 14. Therefore, it is possible to simplify the configuration of workpiece position detecting means and to reduce the manufacturing cost.

(5) With the switching signal st, the printing processing can be performed with respect to the workpiece even in a single trigger operation.

In addition, the above-described embodiment may be modified as follows.

When the printing data of the workpiece to be printed next is created in parallel during the printing processing with respect to each workpiece, the waiting time between the printing processing with respect to each workpiece may be reduced or eliminated. Then, it is possible to further shorten the time required for performing the printing processing with respect to a large number of workpieces.

While the invention has been described in detail and with reference to specific embodiments, it will be apparent to those skilled in the art that various changes or modifications can be made without departing from the spirit and scope of the invention.

The present application is based on Japanese Patent Application (No. 2016-238837) filed on Dec. 8, 2016, and the content thereof is incorporated herein by reference.

DESCRIPTION OF REFERENCE SIGNS

11: Laser Marker Device
12: Workpiece Conveying Device (Belt Conveyor)
13: Trigger Sensor
14: Encoder
15: FIFO Memory
16: Free Running Counter
17: Printing Control Unit (Printing Processing CPU)
18: Printing Control Unit (Printing Timing Measurement Counter)
wd: Workpiece Detection Position
ac: Printing Position
L: Laser Light

What is claimed is:

1. A laser processing device comprising:
a trigger sensor configured to detect multiple workpieces sequentially conveyed by a workpiece conveying device at a workpiece detection position, and output a trigger signal every time a workpiece is detected;
a laser marker device configured to sequentially perform printing processing with respect to the workpiece if the workpiece is conveyed to a printing position based on the trigger signal; and
an encoder configured to output a pulse signal such that a number of pulses corresponds to a workpiece conveying distance of the workpiece conveying device,
wherein the laser marker device comprises:
a free running counter configured to output a free count value obtained by counting the number of pulses in the pulse signal;
a FIFO memory configured to sequentially store the free count value as a trigger timing count value every time the trigger signal is output; and
a printing control unit configured to sequentially read out the trigger timing count value from the FIFO memory in order of storage, recognize a position of the workpiece to be printed next, and perform the printing processing with respect to the workpiece if the workpiece is conveyed to the printing position.

2. The laser processing device according to claim 1,
wherein the printing control unit comprises:
a printing processing CPU configured to compare the trigger timing count value with the free count value at a time of reading out of the trigger timing count value, compute the position of the workpiece to be printed next, and perform a control so as to wait for the printing processing until the workpiece is transferred to the printing position.

3. The laser processing device according to claim 2, wherein the printing control unit comprises:
   the printing processing CPU configured to compute a remaining distance to the printing position of the workpiece based on the position of the workpiece; and
   a printing timing measurement counter configured to compute an arrival timing at which the workpiece arrives at the printing position based on the remaining distance, and output a printing start signal to the printing processing CPU at the arrival timing.

4. The laser processing device according to claim 3, wherein the printing timing measurement counter is configured to compute the arrival timing based on the remaining distance and the pulse signal output from the encoder.

5. The laser processing device according to claim 2, wherein the printing processing CPU is configured to generate printing data of the workpiece to be printed next during waiting for the printing processing.

* * * * *